Aug. 15, 1939.  F. G. WILLIAMSON  2,169,751
BRAKE RIGGING
Filed Oct. 11, 1938  2 Sheets-Sheet 1
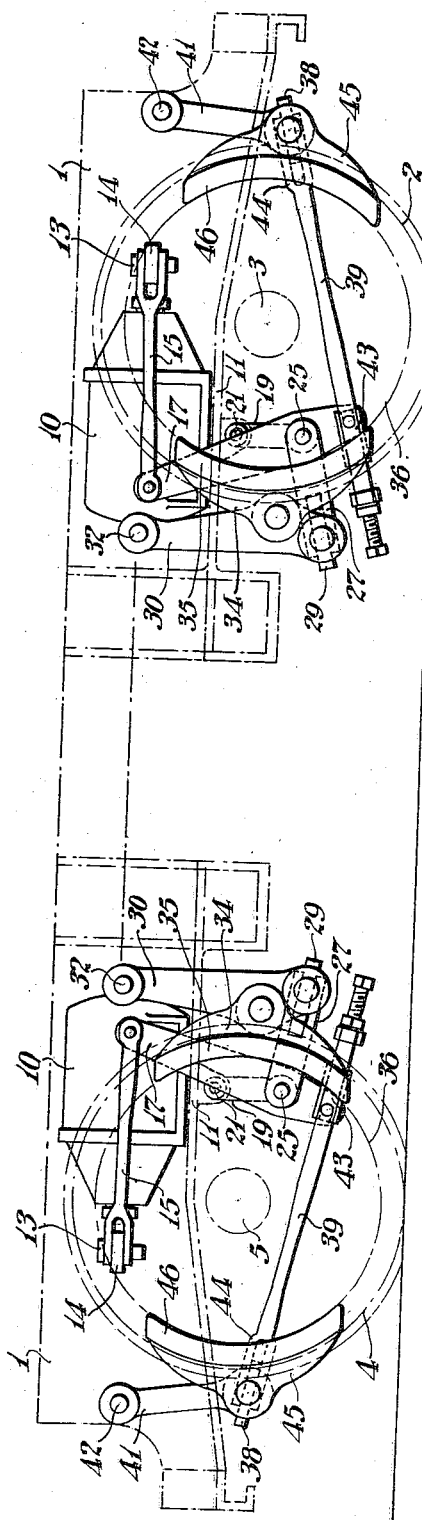
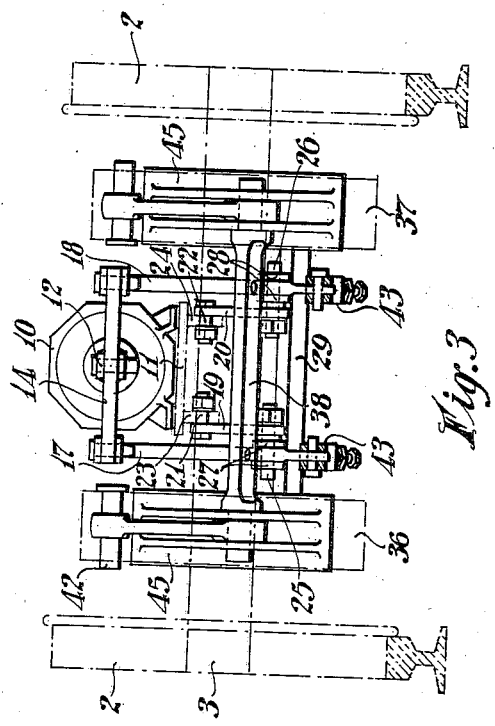
INVENTOR
Frederick G. Williamson
BY
HIS ATTORNEY

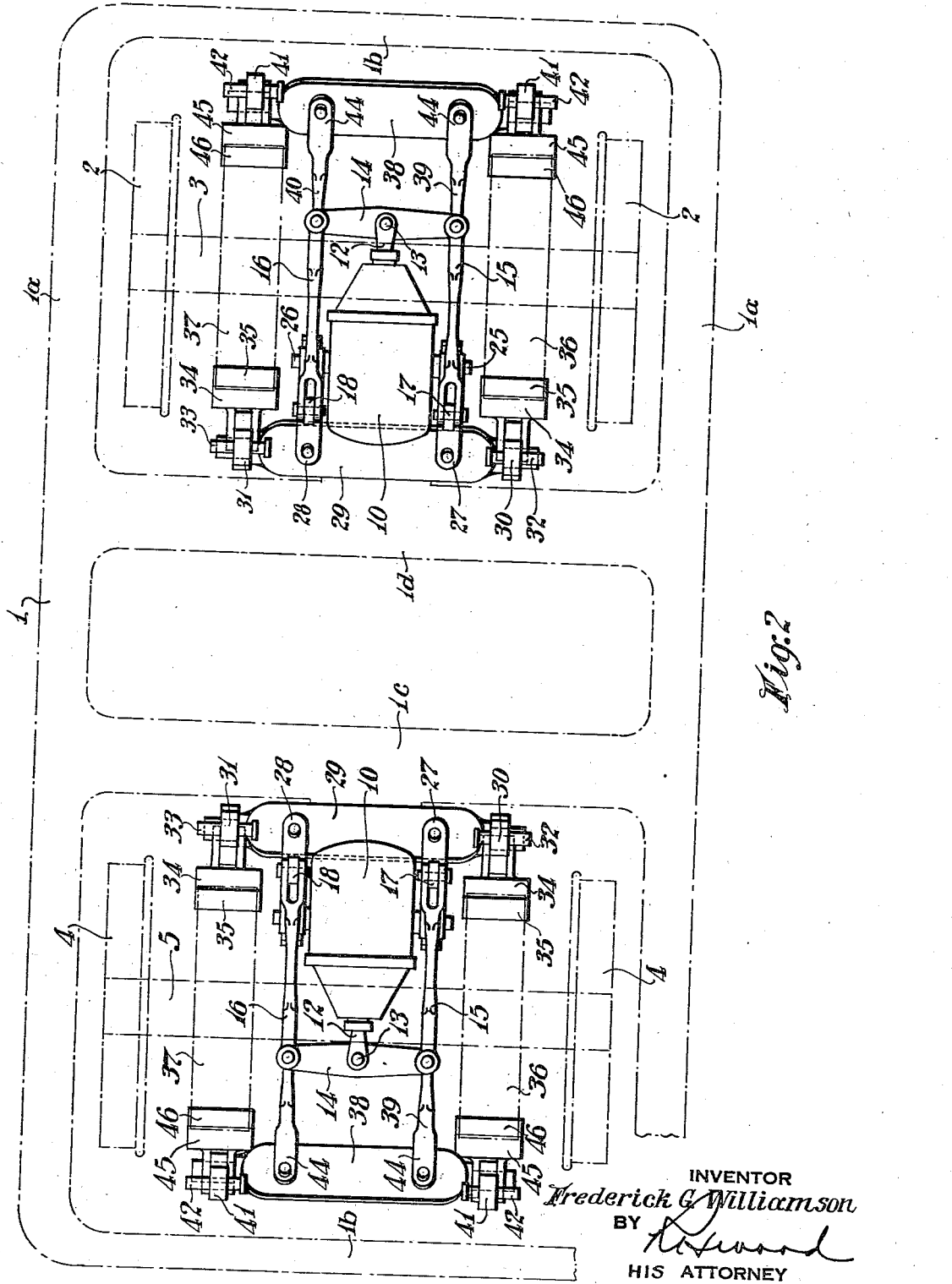

Patented Aug. 15, 1939

2,169,751

UNITED STATES PATENT OFFICE 2,169,751

BRAKE RIGGING

Frederick G. Williamson, Swissvale, Pa., assignor to The American Brake Company, Swissvale, Pa., a corporation of Missouri Application October 11, 1938, Serial No. 234,445

7 Claims. (Cl. 188—58)

My invention relates to brake rigging, and particularly to brake rigging of the clasp type for railway vehicle trucks which are intended to be used on modern high speed trains.

One object of my invention is to provide brake rigging which can be mounted on the frame of a railway vehicle truck, and which will permit a relatively high braking power of the order of 250 per cent of the weight on the truck to be applied to the truck wheels without causing undue tipping of the truck frame.

Other objects and characteristic features of my invention will appear as the description proceeds.

I shall describe one form of brake rigging embodying my invention, and shall then point out the novel features thereof in claims.

In the accompanying drawings, Fig. 1 is a side elevational view of a railway car truck provided with brake rigging embodying my invention, only a portion of the truck frame being shown to improve the showing of the brake rigging. Fig. 2 is a top plan view of the truck and brake rigging shown in Fig. 1. Fig. 3 is a right-hand end view of that portion of the brake rigging which is associated with the right-hand wheel and axle assembly in Figs. 1 and 2.

Similar reference characters refer to similar parts in each of the several views.

Referring to the drawings, I have here shown my invention applied to a four-wheel car truck comprising a truck frame 1 supported at one end by a wheel and axle assembly consisting of a pair of wheels 2 mounted on an axle 3, and at the other end by a wheel and axle assembly consisting of a pair of wheels 4 mounted on an axle 5. The truck frame 1 may have any preferred construction, and as here illustrated includes spaced side members 1a connected by transversely extending end members 1b and spaced center members or transoms 1c and 1d. The means for supporting the truck frame by the wheel and axle assemblies are not shown because these means are well-known and comprise no part of my present invention.

The brake rigging comprises two separate and independent brake mechanisms one of which is associated with each wheel and axle assembly. These two mechanisms are similar, and description of one will therefore suffice for both.

Referring particularly to the brake mechanism associated with the wheels 2 and axle 3, this mechanism is actuated by a brake cylinder 10 which as here shown is mounted on a platform 11 formed on the frame 1 directly in rear of the axle 3 in line with the center line of the truck. The brake cylinder 10 is of the usual and well-known construction, and includes the usual cylinder body, reciprocable piston (not shown) biased to the inner end of its stroke by the usual release springs (not shown), and a push rod 12 which is operatively connected with the piston.

The outer end of the push rod 12 is operatively connected by means of a pin 13 with an equalizing lever 14 intermediate its ends, and the equalizing lever 14, in turn, is operatively connected at its ends through the medium of pull rods 15 and 16 with the upper ends of a pair of floating live levers 17 and 18, respectively. The live levers 17 and 18 are suspended from the truck frame by means of links 19 and 20 which are pivoted at their upper ends on pins 21 and 22 mounted in depending lugs 23 and 24 formed on the platform 11, and which are pivotally attached at their lower ends to the live levers intermediate their ends by means of pins 25 and 26.

The pins 25 and 26 also serve to secure to the live levers double jaws 27 and 28 by means of which the levers are connected with a brake beam 29. The brake beam 29 is suspended from the truck frame by means of dead levers 30 and 31, the lower ends of which receive trunnions formed on the opposite ends of the brake beam, and the upper ends of which are pivoted on pins 32 and 33 mounted in the truck frame. Each of the dead levers 30 and 31 is provided intermediate its ends with a brake head 34 carrying a brake shoe 35 for cooperation with brake drums 36 and 37 mounted on the axle 3 inboard of the wheels 2.

The lower ends of the live levers 17 and 18 are connected with a brake beam 38 at points equally spaced from its ends by means of pull rods 39 and 40. The brake beam 38 is suspended from the truck frame by means of hanger links 41, the lower ends of which receive trunnions formed on the ends of the beam, and the upper ends of which are pivoted on pins 42 secured to the truck frame. The pull rods 39 and 40 are each provided at the end which is connected to the associated live lever with a slack adjuster 43 of well-known construction, and at the opposite end with a jaw 44 which receives the brake beam. The trunnions formed on the end of the brake beam 38 also pivotally support brake heads 45 which carry brake shoes 46 for cooperation with the brake drums 36 and 37.

As was previously pointed out, the brake mechanism associated with the wheels 4 and axle 5 is similar to that associated with the wheels 2 and axle 3. It should be noted, however, that the mechanism associated with the wheels 4 and axle 5 is turned in the opposite direction from that associated with the wheels 2 and axle 3 so that the brake shoes which are attached to the dead levers of both brake mechanisms are disposed at the inner sides of the drums. The reason for this arrangement will be made clear presently.

When it is desired to effect an application of the brakes, fluid pressure is simultaneously supplied to both brake cylinders 10 in the usual manner, thereby forcing the push rods 12 outwardly in these cylinders. This outward movement of the push rods acts through the associated equalizing levers 14 and associated pull rods 15 and 16 to move the upper ends of the live levers 17 and 18 in the same direction that the push rods are moved and with equal forces. This movement of the live levers, in turn, acts through the double jaws 27 and 28, brake beam 29 and dead levers 30 and 31 to move the brake shoes 35 into frictional engagement with the brake drums 36 and 37, and through the pull rods 39 and 40, and brake beam 38 to move the brake shoes 46 into frictional engagement with the outer sides of the brake drums, thereby applying clasp brakes to the brake drums, and hence applying braking power to the wheels.

When it is desired to release the brakes, the fluid pressure which was supplied to the brake cylinders is vented to atmosphere, and the release springs in the brake cylinders then function to restore the push rods to their retracted positions and thereby effect the release of the brakes.

When the brake shoes move into frictional engagement with the brake drums due to a brake application, the frictional forces which are set up by the rotation of the drums tend to move the shoes which are disposed at the forward sides of the drums downwardly, and the shoes which are disposed at the rear sides of the drums upwardly. Furthermore, inasmuch as the shoes are disposed a slight distance below the center lines of the drums, the forces which are exerted on the shoes to move them into frictional engagement with the drums cause a downward component to be exerted on all of the shoes which component tends to move them downwardly along the drums, and which in the case of the shoes which are disposed at the forward sides of the drums adds to the total downward force exerted by the shoes, and in the case of the shoes which are disposed at the rear sides of the drums decreases the total upward force exerted by the shoes. The downward and upward forces which are exerted on the shoes will, of course, be transmitted through the hangers 41 and dead levers 30 and 31 to the truck frame, with the result that the forces exerted by the shoes 46 will act through the relatively long lever arms extending between the points of attachment of the hangers 41 with the frame and the center of the frame, to exert a clockwise torque on the frame, while the forces exerted on the shoes 35 will act through the relatively shorter lever arms extending between the points of attachment of the dead levers 30 and 31 with the frame and the center of the frame to exert an opposing torque on the frame. If the forces exerted on the shoes 46 to effect an application of the brakes are made equal to those exerted on the shoes 35, as has heretofore generally been the case with clasp brakes, it will be apparent that the clockwise torque exerted on the frame due to the resultant forces developed in the shoes 46 will exceed the opposing torque exerted on the frame due to the resultant forces developed in the shoes 35 since these first mentioned forces act through longer lever arms, and a resultant clockwise torque will therefore be developed which torque must be resisted by the truck springs, and which torque tends to produce tipping of the truck frame. As long as the car speeds are relatively low, the brake shoe pressures required are relatively low, and under these conditions the resultant torque is insufficient to be objectionable. However, as the car speeds increase, the brake shoe pressures required increase with the result that at the higher car speeds unless some means are provided to prevent it, the clockwise torque will become sufficient to cause serious tipping of the truck frame, it being noted that as the frame tips, the distance between the brake shoes associated with the forward pair of drums and the horizontal center line of the drums will increase, while the distance between the brake shoes associated with the rear pair of drums and the horizontal center line of these drums will decrease which acts to accentuate the rotational torque exerted on the frame. If the truck springs are allowed to become heavily stressed due to this tipping, the wheels cannot fully adjust themselves to vertical inequalities in the track rails, and, as one or more of the wheels pass over the uneven sections of the rails, they may for an instant have a tendency to leave the rails or to at least have a greatly reduced frictional contact therewith. The tendency of the wheels to slide is thereby greatly increased, and since wheel sliding is, for well-known reasons, very objectionable, it is extremely desirable to prevent excessive tipping of the frame. Moreover, if the frame is allowed to tip, and the brake cylinder pressures are reduced following a heavy brake application to effect a partial release of the brakes, the stressed springs act through the medium of the truck frame and brake rigging to cause the shoes to move toward the center lines of the drums. This movement of the brake shoes tends to maintain them in braking engagement with the drums and thereby offsets to a large extent the reduction in brake cylinder pressure which caused the movement of the shoes relative to the drums until the frame has returned to its normal position, at which time the action of the springs ceases and the partial release of the brakes is finally effected through a further reduction in brake cylinder pressure. In braking high speed trains, it is desirable to be able to effect a quick partial release of the brakes with a minimum reduction in brake cylinder pressure to maintain the maximum braking effect and still prevent wheel slippage, and the movement of the shoes by the truck springs greatly increases the reduction in brake cylinder pressure which must be made before the proper partial release can be effected, and hence delays the release of the brakes. It follows, therefore, that it is desirable to prevent tipping of the truck frame for this reason also.

In accordance with my present invention, I minimize this tendency of the truck frame to tip by so proportioning the parts that the pressures exerted on the inside brake shoes, that is to say, on the brake shoes 35, will be greater than those exerted on the outside brake shoes, whereby the torque exerted on the frame due to the engagement of the inside shoes with the brake drums will offset the clockwise torque exerted on the frame by the other brake shoes a sufficient amount to prevent excessive tipping even at the higher braking ratios.

It should be pointed out that with the brake rigging constructed in the manner described and with the parts proportioned in the manner just described the truck may be run in either direction and the operation of the brake rigging will be the same.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a railway vehicle truck comprising a truck frame resiliently supported on spaced wheel and axle assemblies, the combination of braking surfaces rotatable with the wheel and axle assemblies, brake rigging secured to the truck frame and including a pair of brake shoes associated with each braking surface for applying clasp brakes thereto, and means for applying to the inside shoe associated with each braking surface a greater force than is applied to the outside shoe to minimize tipping of the truck frame caused by engagement of the shoes with the braking surface when a brake application takes place.

2. In a railway vehicle truck comprising a truck frame resiliently supported on spaced wheel and axle assemblies, the combination of a brake drum mounted on each axle, brake rigging secured to the truck frame and including a pair of brake shoes associated with each drum for applying clasp brakes thereto, and means for applying to the shoes of each pair unequal braking forces to minimize tipping of the truck frame caused by the torque exerted on the frame due to the engagement of the shoes with the rotating brake drums.

3. In a railway vehicle truck comprising a truck frame resiliently supported on spaced wheel and axle assemblies, the combination of a brake drum mounted on each axle, brake rigging secured to the truck frame and including a pair of brake shoes associated with each drum for applying clasp brakes thereto, and means for applying to the inside shoe of each pair a greater force than is applied to the outside shoe to minimize tipping of the truck frame caused by engagement of the shoe with the braking surface.

4. In a railway vehicle truck comprising a truck frame resiliently supported on spaced wheel and axle assemblies, the combination of a braking surface rotatable with each wheel and axle assembly, brake rigging suspended from the truck frame and including a pair of brake shoes associated with each braking surface for applying clasp brakes thereto, and means for applying to the two shoes of each pair unequal forces to cause the shoes which are nearest to the center of the truck to exert greater forces than the shoes which are farthest from the center of the truck to minimize tipping of the truck frame caused by a brake application.

5. In a railway vehicle truck comprising a truck frame resiliently supported on spaced wheel and axle assemblies, the combination with braking surfaces rotatable with each wheel and axle assembly, of two separate brake mechanisms mounted on the truck frame and each including a pair of shoes for applying clasp brakes to each braking surface, and means for applying to the shoes which are nearest to the center of the truck greater forces than are applied to the shoes which are farthest from the center of the truck.

6. In a railway vehicle truck comprising a truck frame resiliently supported on spaced wheel and axle assemblies, the combination of a pair of brake drums mounted on each axle inboard of the wheels, brake rigging mounted on said frame and including a pair of brake shoes located on opposite sides of each drum for applying clasp brakes thereto, and means for exerting on the shoes which are nearest the center of the truck a greater force than is exerted on the remaining shoes.

7. In a railway vehicle truck comprising a truck frame resiliently supported on spaced wheel and axle assemblies, the combination of a pair of brake drums mounted on each axle inboard of the wheels, two separate brake mechanisms mounted on the truck frame one adjacent each wheel and axle assembly and each including a pair of brake shoes located on opposite sides of each drum for applying clasp brakes thereto, and means for exerting on the shoes which are nearest the center of the truck frame a greater braking force than is applied to the remaining shoes to minimize tipping of the frame caused by a brake application.

FREDERICK G. WILLIAMSON.